United States Patent
Wu et al.

(10) Patent No.: US 11,205,098 B1
(45) Date of Patent: Dec. 21, 2021

(54) SINGLE-STAGE SMALL-SAMPLE-OBJECT DETECTION METHOD BASED ON DECOUPLED METRIC

(71) Applicant: INSTITUTE OF AUTOMATION, CHINESE ACADEMY OF SCIENCES, Beijing (CN)

(72) Inventors: Zhengxing Wu, Beijing (CN); Junzhi Yu, Beijing (CN); Yue Lu, Beijing (CN); Xingyu Chen, Beijing (CN)

(73) Assignee: INSTITUTE OF AUTOMATION, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/373,831

(22) Filed: Jul. 13, 2021

(30) Foreign Application Priority Data

Feb. 23, 2021 (CN) .......................... 202110199642.9

(51) Int. Cl.
| | |
|---|---|
| *G06K 9/00* | (2006.01) |
| *G06K 9/62* | (2006.01) |
| *G06T 7/70* | (2017.01) |
| *G06T 7/60* | (2017.01) |
| *G06N 3/04* | (2006.01) |

(Continued)

(52) U.S. Cl.
CPC ............. *G06K 9/6257* (2013.01); *G06K 9/46* (2013.01); *G06K 9/6262* (2013.01); *G06K 9/6268* (2013.01); *G06N 3/04* (2013.01); *G06N 3/08* (2013.01); *G06T 7/60* (2013.01); *G06T 7/70* (2017.01); *G06T 2207/20081* (2013.01); *G06T 2207/20084* (2013.01)

(58) Field of Classification Search
CPC ...... G06K 9/6257; G06K 9/46; G06K 9/6262; G06K 9/6268; G06N 3/04; G06N 3/08; G06T 7/60; G06T 7/70; G06T 2207/20081; G06T 2207/20084
See application file for complete search history.

(56) References Cited

U.S. PATENT DOCUMENTS

| | | | |
|---|---|---|---|
| 2020/0257975 A1* | 8/2020 | Chang | G06F 40/30 |
| 2020/0327450 A1* | 10/2020 | Huang | G06N 20/10 |
| 2021/0192730 A1* | 6/2021 | Raciti | G06K 9/4671 |

\* cited by examiner

*Primary Examiner* — Ping Y Hsieh
(74) *Attorney, Agent, or Firm* — Bayramoglu Law Offices LLC

(57) ABSTRACT

A single-stage small-sample-object detection method based on decoupled metric is provided to solve the following problems: low detection accuracy of existing small-sample-object detection methods, the mutual interference between classification and regression in a non-decoupled form, and over-fitting during training of a detection network in case of small samples. The method includes: obtaining a to-be-detected image as an input image; and obtaining a class and a regression box corresponding to each to-be-detected object in the input image through a pre-constructed small-sample-object detection network DMNet, where the DMNet includes a multi-scale feature extraction network, a decoupled representation transformation module, an image-level distance metric learning module and a regression box prediction module. The new method avoids the over-fitting during training of the detection network, eliminates the mutual interference between the classification branch and the regression branch, and improves the accuracy of small-sample-object detection.

9 Claims, 7 Drawing Sheets

(51) Int. Cl.
*G06N 3/08* (2006.01)
*G06K 9/46* (2006.01)

SINGLE-STAGE SMALL-SAMPLE-OBJECT DETECTION METHOD BASED ON DECOUPLED METRIC

CROSS REFERENCE TO THE RELATED APPLICATIONS

This application is based upon and claims priority to Chinese Patent Application No. 202110199642.9, filed on Feb. 23, 2021, the entire contents of which are incorporated herein by reference.

TECHNICAL FIELD

The present invention relates to the field of computer vision, and more particularly, to a single-stage small-sample-object detection method based on decoupled metric.

BACKGROUND

In the rapidly growing field of deep learning, deep neural networks have achieved great success in vision thanks to the training and studying of big data. However, in some real instances, relevant visual data is scarce, such as underwater data and medical data. In computer vision tasks, convolutional neural networks (CNNs) have been widely used. The two-stage detectors represented by Faster Region-based CNN (RCNN) proposed by Ren et al. and the single-stage detectors represented by Single Shot MultiBox Detector (SSD) proposed by Liu et al. have achieved positive results in object detection. Both types of detectors, however, have a problem: when the training data is very small, over-fitting easily occurs during the training, which leads to a great drop in performance of the detector.

As a method of similarity learning, metric learning has better generalization than the CNNs, and thus is often used for small sample classification. Karlinsky et al. designed a classification module based on metric learning and applied it to object detection, thereby improving performance of the detector in small-sample-object detection. This method, however, relies on region of interest (ROI) Pooling in the two-stage detection method, can only perform instance-level processing, and cannot directly detect the entire feature map. This results in a relatively slow detection speed of the detector, and it is difficult to achieve real-time detection.

In addition, there is a long-standing problem, that is, the representation difference between classification and regression. The classification should have translation invariance, that is, a classification result should be unchanged when an a priori reference box is shifted by a small amount; while the regression should have translation variability, that is, regression prediction should be changed accordingly when the a priori reference box is shifted. A regression header and a classification header of the detector usually use the shared features, but this approach does not solve the difference. When training data is sufficient, this representation difference does not significantly affect the performance of the detector, but in case of small samples, that is, when the training data is very scarce, this difference becomes obvious and thus affects the performance of the detector.

SUMMARY

In order to solve the above-mentioned problems in the prior art, to be specific, the insufficient detection accuracy of existing small-sample-object detection methods, the mutual interference between classification and regression in a non-decoupled form, and over-fitting during training of a detection network in the case of small samples. According to a first aspect of the present invention, a single-stage small-sample-object detection method based on decoupled metric is proposed. The method includes the following steps:

obtaining a to-be-detected image as an input image; and obtaining a class and a regression box corresponding to each to-be-detected object in the input image through a pre-constructed small-sample-object detection network DMNet; the regression box includes information about position, width and height;

the DMNet includes a multi-scale feature extraction network, a decoupled representation transformation (DRT) module, an image-level distance metric learning (IDML) module, and a regression box prediction module;

the multi-scale feature extraction network is configured to extract a multi-scale feature of the input image, and perform convolution on the extracted multi-scale feature;

a feature obtained after the convolution is performed is used as a first feature;

the DRT module is constructed based on a first convolution branch, a classification branch, and a regression branch;

the first convolution branch is configured to perform background filtering on the first feature to obtain a foreground feature;

the classification branch and the regression branch are both constituted based on two convolutional layers and one deformable convolutional layer; the classification branch and the regression branch are both configured to perform convolution and deformable convolution on the first feature in combination with the foreground probability, to obtain an a priori reference box and an adaptive decoupled representation feature, that is, to obtain a classification a priori reference box and a classification decoupled representation feature, or a regression a priori reference box and a regression decoupled representation feature;

the IDML module is configured to embed the classification decoupled representation feature into a metric feature space through a pre-constructed embedding unit to obtain an embedding vector; and to calculate a distance between the embedding vector and a feature vector corresponding to a preset class to obtain a class of each to-be-detected object in the input image; the embedding unit is constituted based on two 1×1 convolutions; and the regression box prediction module is configured to obtain the regression box of each to-be-detected object in the input image through a pre-constructed convolution sub-network based on the regression decoupled representation feature and the regression a priori reference box.

In some preferred implementations, that the classification branch and the regression branch are both configured to perform convolution and deformable convolution on the first feature in combination with the foreground probability, to obtain an a priori reference box and an adaptive decoupled representation feature may specifically include:

performing convolution on the first feature to obtain information about width and height corresponding to an a priori reference box of an object in the input image;

retaining an a priori reference box of an object with a foreground probability being greater than a preset foreground probability threshold, and filtering out other a priori reference boxes used as backgrounds;

performing convolution on information about width and height of the retained a priori reference box to generate an offset; and performing deformable convolution on the first feature through the deformable convolutional layer in combination with the offset, to obtain an adaptive decoupled representation feature, that is, to obtain a classification decoupled representation feature or a regression decoupled representation feature.

In some preferred implementations, a method for calculating the distance between the embedding vector and the feature vector corresponding to the preset class to obtain the class of each to-be-detected object in the input image is as follows:

$$p_i(E) = \exp\left(-\frac{d_i^2(E, R_i)}{2\sigma^2}\right)$$

$$P(i|E) = \frac{p_i(E)}{\sum_{i=1}^{N_{cls}} p_i(E)}$$

where, E indicates the embedding vector, $R_i$ indicates a feature vector corresponding to an $i^{th}$ preset class, $d(E,R_i)$ indicates a distance between the embedding vector and the feature vector corresponding to the $i^{th}$ preset class, $p_i(E)$ indicates a probability that the embedding vector belongs to the $i^{th}$ preset class, $N_{cls}$ indicates the number of classes, and $P(i|E)$ indicates a confidence of each class, where a preset class with a maximum confidence is used as a class of the to-be-detected object.

In some preferred implementations, a method for training the pre-constructed small-sample-object detection network DMNet may include:

A10: obtaining a training sample image, calibration information calibrated as a foreground or a background, a true class and a true regression box, wherein the calibration information calibrated as the foreground or the background, the true class and the true regression box correspond to each to-be-detected object;

A20: extracting a multi-scale feature of the training sample image, and performing convolution on the extracted multi-scale feature; the feature obtained after the convolution is performed is used as the first feature;

A30: inputting the first feature into the DRT module to obtain the classification a priori reference box, the classification decoupled representation feature, the regression a priori reference box and the regression decoupled representation feature;

A40: selecting points in $R_p(x_g, y_g, \eta_p \times w_g, \eta_p \times h_g)$ as a positive training sample, and points outside $R_i(x_g, y_g, \eta_i \times w_g, \eta_i \times h_g)$ as a negative training sample, where $\eta_p$ and $\eta_i$ are preset parameters, $0 < \eta_p < \eta_i < 1$, $x_g, y_g, w_g, h_g$ indicate center coordinates, a width and a height of the true regression box, and $R_p$ indicates rectangular areas; calculating a foreground loss in combination with a predicted foreground probability and calibration information corresponding to each point of the positive sample and the negative sample, where the foreground loss is used as a first loss; obtaining an intersection over union (IoU) between the regression a priori reference box and the true regression box, and calculating a loss between a true regression box corresponding to a maximum IoU and each regression a priori reference box to be used as a second loss;

A50: embedding the classification decoupled representation feature into the metric feature space through the pre-constructed embedding unit to obtain the embedding vector; calculating the distance between the embedding vector and the feature vector corresponding to the preset class to obtain a class of each to-be-detected object in the training sample image as a predicted class;

A60: calculating a cross-entropy loss in combination with a probability of the predicted class and the true class corresponding to each to-be-detected object to be used as a third loss; and calculating a loss between the predicted class and the corresponding true class to be used as a fourth loss;

A70: obtaining, based on the regression decoupled representation feature and the regression a priori reference box and through the convolution sub-network, offsets of center coordinates, a width and a height of a predicted regression box relative to the regression a priori reference box to be used as predicted offsets; and adjusting the regression a priori reference box according to the predicted offsets to obtain the predicted regression box;

A80: obtaining true offsets of center coordinates, a width and a height of the true regression box of each to-be-detected object relative to the regression a priori reference box; and calculating a loss between the predicted offsets and the true offsets to be used as a fifth loss;

A90: performing a weighted summation on the first loss, the second loss, the third loss, the fourth loss and the fifth loss to obtain a total loss; and updating network parameters of the small-sample-object detection network DMNet based on the total loss; and A100: repeating steps A10 to A90 until a trained small-sample-object detection network DMNet is obtained.

In some preferred implementations, the first loss $\mathcal{L}_{obj}$ is calculated by:

$$\mathcal{L}_{obj} = -\alpha(1-y_p)^\gamma y_t \log y_p - (1-\alpha)y_p^\gamma (1-y_t)\log(1-y_p)$$

where, $y_p$ indicates the predicted foreground probability, $y_t$ indicates whether the calibration information is the foreground, and if yes, the value is 1, otherwise, the value is 0, γ indicates a scaling factor, and a indicates a balance factor.

In some preferred embodiments, the second loss $\mathcal{L}_{shape}$ is calculated by:

$$\mathcal{L}_{shape} = \mathcal{L}_1\left(1 - \min\left(\frac{w}{w_t}, \frac{w_t}{w}\right)\right) + \mathcal{L}_1\left(1 - \min\left(\frac{h}{h_t}, \frac{h_t}{h}\right)\right)$$

where, w and h indicate a width and a height of the regression a priori reference box, respectively, $\mathcal{L}_1$ indicates a smooth L1 loss, and $(w_t, h_t)$ indicate a length and a width of the true regression box corresponding to the maximum IoU.

In some preferred implementations, the third loss $\mathcal{L}_{cls}$ is calculated by:

$$\mathcal{L}_{cls} = -\Sigma_i y_i \log p_i$$

where, $p_i$ indicates a probability that a predicted object is the $i^{th}$ class, and $y_i$ indicates whether the true class is the $i^{th}$ class, if yes, the value is 1, otherwise, the value is 0.

In some preferred embodiments, the fourth loss $\mathcal{L}_{emb}$ is calculated by:

$$\mathcal{L}_{emb} = \left| d(E, R_i) - \min_{j \neq 1} d(E, R_i) + \alpha \right|_+$$

where, j indicates a serial number of the predicted class, i indicates a serial number of the true class, a indicates a manually set threshold, $|.|_+$ indicates a Rectified Linear Unit (ReLU) function, E indicates the embedding vector, and $R_i$ indicates a feature vector corresponding to the $i^{th}$ preset class.

In some preferred implementations, the fifth loss $\mathcal{L}_{reg}$ is calculated by:

$$\mathcal{L}_{reg} = \sum_{i \in \{x,y,w,h\}} \begin{cases} 0.5(t_i - p_i)^2, & |t_i - p_i| < 1 \\ |t_i - p_i| - 0.5, & \text{others} \end{cases}$$

where, $t_i$ indicates the true offsets, $p_i$ indicates the predicted offsets, x and y indicate offsets of the center coordinates of the predicted regression box, and w and h indicate offsets of the width and the height of the predicted regression box, respectively.

In some preferred embodiments, the total loss is calculated by:

$$\mathcal{L} = \omega_1 \mathcal{L}_{obj} + \omega_2 \mathcal{L}_{shape} + \omega_3 \mathcal{L}_{cls} + \psi_4 \mathcal{L}_{emb} + \omega_5 \mathcal{L}_{reg}$$

where, $\omega_i$ indicates a weight corresponding to each loss, $\mathcal{L}_{obj}$ indicates the first loss, $\mathcal{L}_{shape}$ indicates the second loss, $\mathcal{L}_{cls}$ indicates the third loss, $\mathcal{L}_{emb}$ indicates the fourth loss, and indicates the fifth loss.

Advantages of the present invention:

The present invention avoids the over-fitting during training of the detection network, eliminates the mutual interference between the classification branch and the regression branch, and improves the accuracy of small-sample-object detection.

(1) The present invention makes the classification branch and the regression branch to not interfere with each other through the decoupled design, to only focus on one of the classification or regression task, thereby improving the detection performance of the detection network in case of small samples. In this way, defects in the a priori reference box of the single-stage detection network that is artificially designed can be overcome. In addition, the DRT module includes foreground prediction, prediction of the width and height of the a priori reference box, and decoupled feature adaptive transformation, which improves the accuracy of general single-stage detection methods while maintaining detection speed, and alleviates over-fitting of neural networks caused by small training data in the case of small samples.

(2) The present invention designs the IDML module, which can embed the classification decoupled representation feature to obtain the embedding vector, and then perform classification based on metric learning. In addition, when the feature is processed, processing may be directly performed on the entire feature map to achieve multi-object parallel metric, and ROI Pooling is not needed. This is easy to be integrated into a single-stage detection network for efficient work, so that the detection network can still accurately detect to-be-detected objects with little training data.

BRIEF DESCRIPTION OF THE DRAWINGS

Other features, objectives and advantages of this application will become more apparent upon reading the detailed description of the non-restrictive embodiments with reference to the following accompanying drawings.

DETAILED DESCRIPTION OF THE EMBODIMENTS

In order to make the objectives, technical solutions and advantages of the embodiments of the present invention clearer, the technical solutions in the embodiments of the present invention are described clearly and completely below with reference to the accompanying drawings. Apparently, the described embodiments are part rather than all of the embodiments. All other embodiments obtained by a person of ordinary skill in the art based on the embodiments of the present invention without creative efforts shall fall within the protection scope of the present invention.

The present invention will be further described in detail below in conjunction with the accompanying drawings and embodiments. It may be understood that the specific embodiments described herein are merely intended to explain the related invention, rather than to limit the present invention. It should also be noted that, for convenience of description, only the parts related to the present invention are shown in the accompany drawings.

It should be noted that the embodiments in this application and features in the embodiments may be combined with each other if no conflict occurs.

Figure 1:
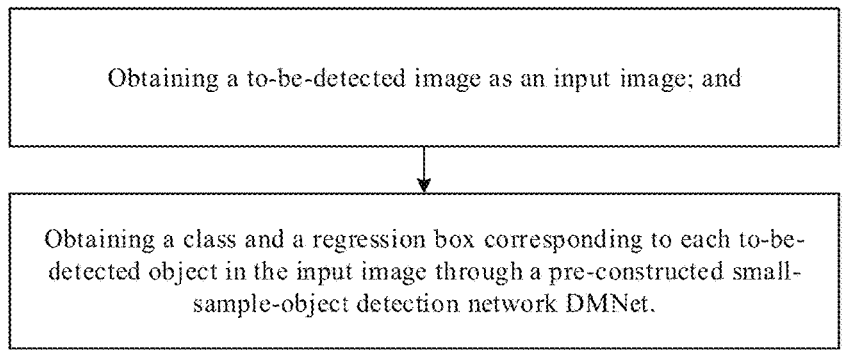
FIG. 1 is a schematic flowchart of a single-stage small-sample-object detection method based on decoupled metric according to an embodiment of the present invention.

As shown in FIG. 1, the single-stage small-sample-object detection method based on decoupled metric of the present invention includes the following steps:

obtaining a to-be-detected image as an input image; and obtaining a class and a regression box corresponding to each to-be-detected object in the input image through a pre-constructed small-sample-object detection network DMNet; the regression box includes information about position, width and height;

the DMNet includes a multi-scale feature extraction network, a decoupled representation transformation (DRT) module, an image-level distance metric learning (IDML) module, and a regression box prediction module;

the multi-scale feature extraction network is configured to extract a multi-scale feature of the input image, and perform convolution on the extracted multi-scale feature;

a feature obtained after the convolution is performed is used as a first feature;

the DRT module is constructed based on a first convolution branch, a classification branch, and a regression branch;

the first convolution branch is configured to perform background filtering on the first feature to obtain a foreground feature;

the classification branch and the regression branch are both constituted based on two convolutional layers and one deformable convolutional layer; the classification branch and the regression branch are both configured to perform convolution and deformable convolution on the first feature in combination with the foreground probability, to obtain an a priori reference box and an adaptive decoupled representation feature, that is, to obtain a classification a priori reference box and a classification decoupled representation feature, or a regression a priori reference box and a regression decoupled representation feature;

the IDML module is configured to embed the classification decoupled representation feature into a metric feature space through a pre-constructed embedding unit to obtain an embedding vector; and to calculate a distance between the embedding vector and a feature vector corresponding to a preset class to obtain a class of each to-be-detected object in the input image; the embedding unit is constituted based on two 1×1 convolutions; and the regression box prediction module is configured to obtain the regression box of each to-be-detected object in the input image through a pre-constructed convolution sub-network based on the regression decoupled representation feature and the regression a priori reference box.

In order to more clearly describe the single-stage small-sample-object detection method based on decoupled metric of the present invention, steps in the method embodiment of the present invention are described in detail below with reference to the accompanying drawings.

In the following embodiment, a training process of the small-sample-object detection network DMNet is first described in detail, and then a process of obtaining a class and a regression box corresponding to each to-be-detected object in an image according to the single-stage small-sample-object detection method based on decoupled metric is described in detail.

Figure 7:
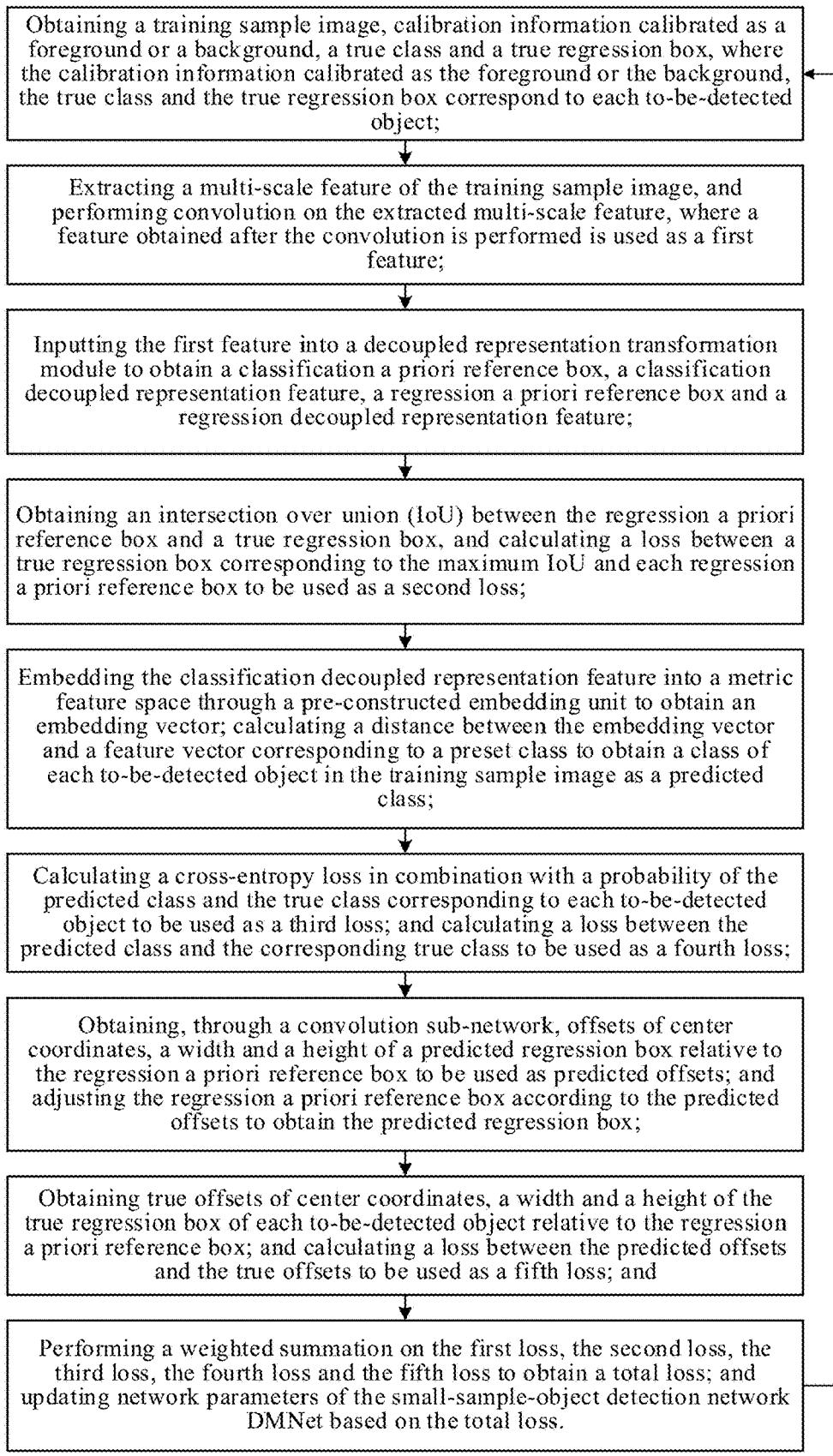
FIG. 7 is a detailed schematic flowchart of a training process of a small-sample-object detection network DMNet according to an embodiment of the present invention.

1. The training process of the small-sample-object detection network DMNet is as shown in FIG. 7.

Figure 2:
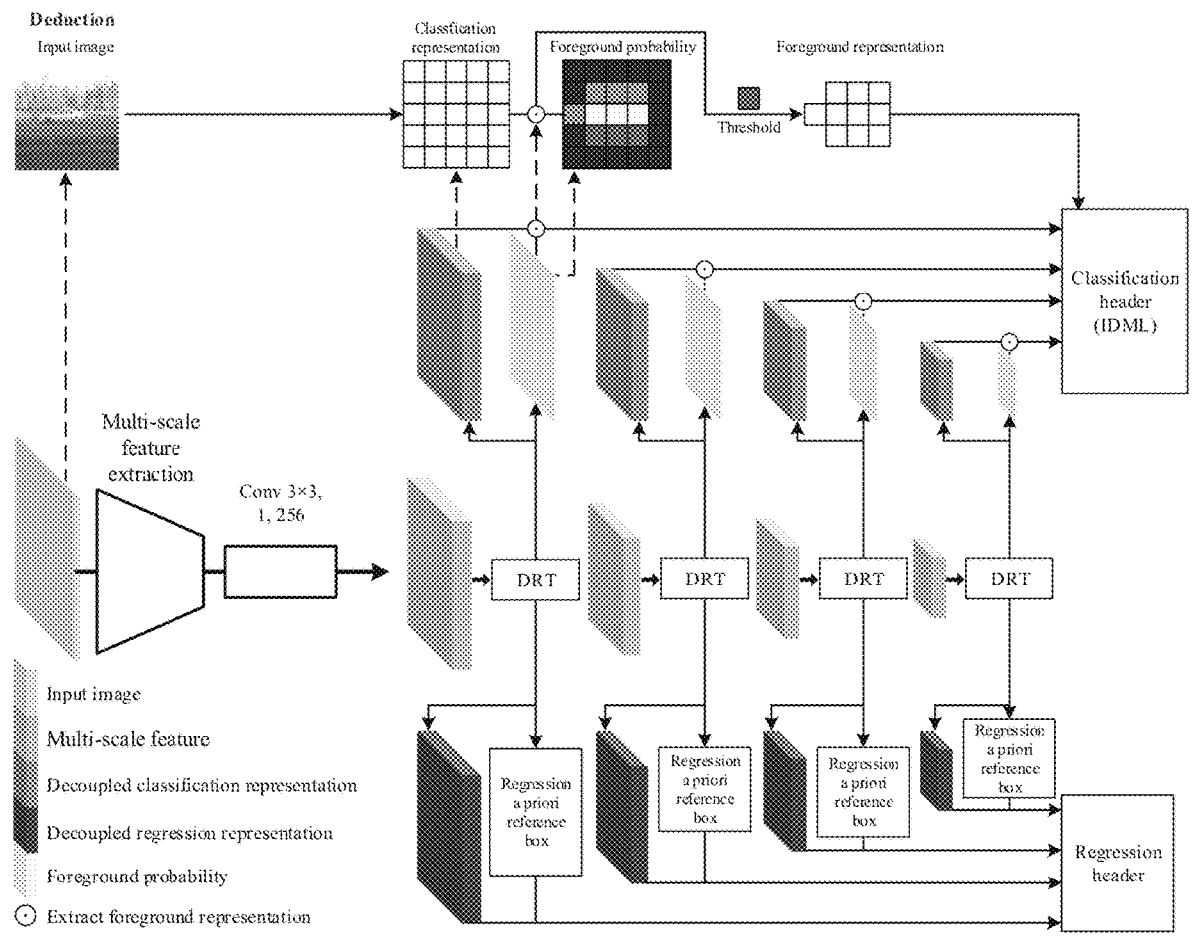
FIG. 2 is a schematic structure diagram of a small-sample-object detection network DMNet according to an embodiment of the present invention.

The overall structure of the small-sample-object detection network DMNet is as shown in FIG. 2, including a multi-scale feature extraction network, a DRT module, an IDML module (that is, the classification header in FIG. 2), and a regression box prediction module (that is, the regression header in FIG. 2). The specific training process of the small-sample-object detection network DMNet is as follows:

A10: obtaining a training sample image, calibration information calibrated as a foreground or a background, a true class and a true regression box, wherein the calibration information calibrated as the foreground or the background, the true class and the true regression box correspond to each to-be-detected object.

In this embodiment, a to-be-detected image is first obtained as the training sample image, and the calibration information calibrated as the foreground or background, the true class and the true regression box that correspond to each to-be-detected object are obtained.

A20: extracting a multi-scale feature of the training sample image, and performing convolution on the extracted multi-scale feature; the feature obtained after the convolution is performed is used as the first feature.

In this embodiment, the multi-scale feature of the training sample image is extracted through a multi-scale feature extraction network in the DMNet, and convolution is performed on the extracted multi-scale feature (such as Cony in FIG. 2, where a convolution kernel corresponding to the convolutional layer is 3×3, the step is 1, the number of channels is 256, and the width and height of each feature are recorded as W, H), where the feature obtained after the convolution is performed is used as the first feature.

The multi-scale feature extraction network in the present invention is preferably ResNeXt-101 or FPN.

A30: inputting the first feature into the DRT module to obtain the classification a priori reference box, the classification decoupled representation feature, the regression a priori reference box and the regression decoupled representation feature.

In this embodiment, the DRT module first predicts probabilities that an a priori sampling points are foregrounds, where regression boxes of the a priori sampling points correspond to steps at different scales; secondly, the DRT module predicts the width and height of the a priori reference boxes for a classification branch and a regression branch; and finally, the DRT module performs adaptive decoupled transformation on the first feature based on the predicted width and height of the a priori reference boxes, so as to obtain the decoupled representation features for the classification header and the regression header respectively.

Figure 3:
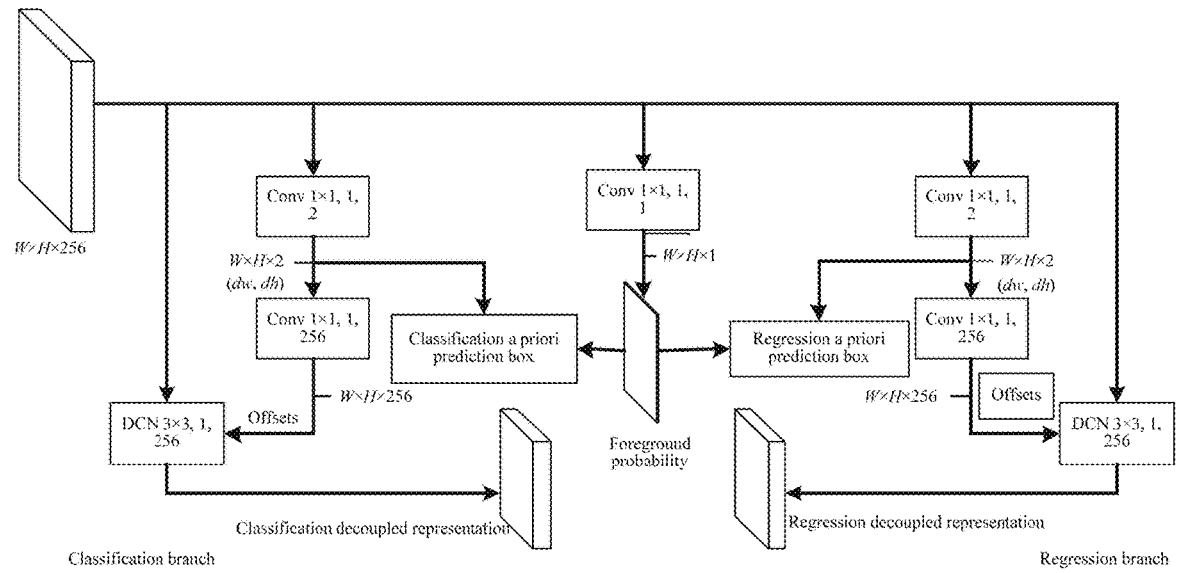
FIG. 3 is a schematic structural diagram of a DRT module according to an embodiment of the present invention.

The DRT module is constructed based on the first convolution branch, the classification branch, and the regression branch, and its structure is shown in FIG. 3.

A convolution kernel of the first convolution branch is 1×1, the step is 1, the number of channels is 1, and the first convolution branch is used to predict a foreground probability map with the size of W×H×1, that is, to obtain the foreground probabilities corresponding to the feature positions of the first feature.

The classification branch and the regression branch are both formed based on two convolutional layers and one deformable convolutional layer. One of the two convolutional layers is configured to perform convolution on the first feature, predict information about the width and height with the size of W×H×2, that is, the a priori reference box, and retain an a priori reference box of an object with a foreground probability being greater than the preset foreground probability threshold, and filter out other a priori reference boxes used as backgrounds; the other one is configured to perform 1×1 convolution on the information about the width and height of the a priori reference box, and generate offsets corresponding to each sampling point.

The offsets and the first feature are input into the deformable convolutional layer for adaptive feature transformation, that is, deformable convolution is performed on the first feature to obtain an adaptive decoupled representation feature. The classification branch and the regression branch are independent of each other, and separately predict the information about the width and height and complete feature adaptive transformation (the decoupled representation feature generated by the classification branch is referred to as the classification decoupled representation feature, and the decoupled representation feature generated by the regression branch is called regression decoupled representation feature), to achieve the purpose of decoupling.

A40: selecting points in $R_p(x_g, y_g, \eta_p \times w_g, \eta_p \times h_g)$ as a positive training sample, and points outside $R_i(x_g, y_g, \eta_i \times w_g, \eta_i \times h_g)$ as a negative training sample, where $\eta_p$ and $\eta_i$ are preset parameters, $0 < \eta_p < \eta_i < 1$, $x_g, y_g, w_g, h_g$ indicate center coordinates, a width and a height of the true regression box, and $R_p$ and $R_i$ indicate rectangular areas; calculating a foreground loss in combination with a predicted foreground probability and calibration information corresponding to each point of the positive sample and the negative sample, where the foreground loss is used as a first loss; obtaining an intersection over union (IoU) between the regression a priori reference box and the true regression box, and calculating a loss between a true regression box corresponding to a maximum IoU and each regression a priori reference box to be used as a second loss.

In this embodiment, it is assumed that the true regression box is $R_g(x_g, y_g, w_g, h_g)$, $R(x, y, w, h)$ indicates a rectangular area, $(x, y)$ are the center coordinates of the rectangular area, w and h are the width and height of the rectangular area, and g indicates a subscript. During foreground prediction, the parameters $\eta_p$ and $\eta_i$ are set, and $0 < \eta_p < \eta_i < 1$. The point in $R_p(x_g, y_g, \eta_p \times w_g, \eta_p \times h_g)$ is selected as the positive training sample, the point outside $R_i(x_g, y_g, \eta_i \times w_g, \eta_i \times h_g$ is selected as the negative training sample, and other points are not involved in the training. The loss function for foreground prediction is Focal Loss, as shown in formula (1):

$$\mathcal{L}_{obj} = -\alpha(1-y_p)^\gamma y_t \log y_p - (1-\alpha)y_p^\gamma(1-y_t)\log(1-y_p)$$

where, $y_p$ indicates the predicted foreground probability, $y_t$ indicates whether the calibration information is the foreground, and if yes, the value is 1, otherwise, the value is 0, $\gamma$ indicates a scaling factor, and $\alpha$ indicates a balance factor.

When the width and height of the a priori reference box are predicted, because the predicted width and height are arbitrary, the general true regression box matching method is not applicable. Therefore, a method for the uncertainty of the shape of the a priori reference box is used here: (1) sampling a number of width and height values and calculate corresponding an a priori reference boxes; (2) calculating an IoU between the regression a priori reference box obtained through sampling and the true regression box, and selecting a true regression box with a maximum IoU as a target value. The width and height of the target value are denoted as $w_t$ and $h_t$, and a loss function for predicting the width and height is as shown in formula (2):

$$\mathcal{L}_{shape} = \mathcal{L}_1\left(1 - \min\left(\frac{w}{w_t}, \frac{w_t}{w}\right)\right) + \mathcal{L}_1\left(1 - \min\left(\frac{h}{h_t}, \frac{h_t}{h}\right)\right) \quad (2)$$

where, w and h indicate a width and a height of the regression a priori reference box, respectively, and $\mathcal{L}_1$ indicates a smooth L1 loss.

A50: embedding the classification decoupled representation feature into the metric feature space through the pre-constructed embedding unit to obtain the embedding vector; calculating the distance between the embedding vector and the feature vector corresponding to the preset class to obtain a class of each to-be-detected object in the input image as a predicted class.

Figure 4:
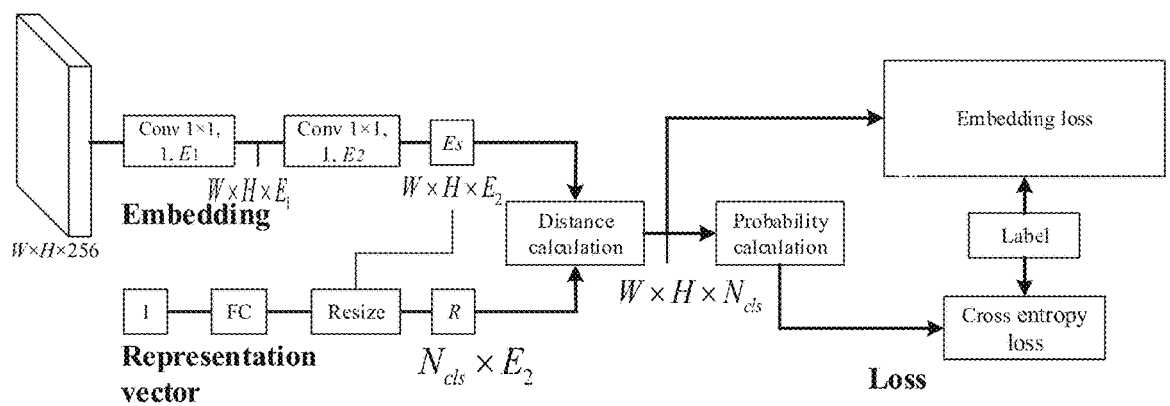
FIG. 4 is a schematic structural diagram of an IDML module according to an embodiment of the present invention.

In this embodiment, the structure of the IDML module is as shown in FIG. 4. The classification decoupled representation feature is embedded into the metric feature space through the pre-constructed embedding unit to obtain the embedding vector. The embedding unit is based on two 1×1 convolutional layers, the output sizes of the two convolutions are respectively w×h×$E_1$ and w×h×$E_2$, $E_1$ and $E_2$ are specified values, and $E_2$ indicates the dimension of the embedding vector. In addition, the distance between two embedding vectors indicates the similarity between them. To be specific, embedding vectors of the same class should be closer, and embedding vectors of different classes should be far apart.

In order to predict the class of the embedding vector, feature vectors of all classes are required, so that the class of the embedding vector is predicted to be a class corresponding to the closest feature vector (namely, a representative vector). The representative vector is generated by a Fully Connected (FC) layer. The output size of the FC layer is $N_{cls}.E_2$, where $N_{cls}$ is the number of classes. After the output is normalized, $N_{cls}$ representative vectors can be obtained. A single embedding vector is denoted as E, a feature vector (namely, the representative vector) corresponding to the class i is $R_i$, and the distance between E and $R_i$ is $d(E, R_i)$. During probability calculation, a Gaussian model is used. The probability that the embedding vector E belongs to the class i is calculated by formula (3):

$$p_i(E) = \exp\left(-\frac{d_i^2(E, R_i)}{2\sigma^2}\right) \quad (3)$$

where, $d(E, R_i)$ indicates the distance between the embedding vector and the feature vector corresponding to the $i^{th}$ preset class, and $p_i(E)$ indicates the probability that the embedding vector belongs to the $i^{th}$ preset class.

Then the confidence of each class is predicted and calculated as follows:

$$P(i|E) = \frac{p_i(E)}{\sum_{i=1}^{N_{cls}} p_i(E)} \quad (4)$$

In the present invention, the preset class with the maximum confidence is used as the class of the to-be-detected object.

For the background $\mathcal{B}$, the confidence is predicted as follows:

$$P(i|\mathcal{B}) = 1 - \max_i P(i|E) \quad (5)$$

A60: calculating a cross-entropy loss in combination with a probability of the predicted class and the true class corresponding to each to-be-detected object to be used as a third loss; and calculating a loss between the predicted class and the corresponding true class to be used as a fourth loss.

In this embodiment, the loss function of IDML is divided into two parts. The first part is the cross-entropy loss, as the third loss, and the second part is the embedding loss, as the fourth loss.

The calculation method of the cross entropy loss is shown in formula (6):

$$\mathcal{L}_{cls} = -\Sigma_i y_i \log p_i \quad (6)$$

where, $p_i$ indicates a probability that a predicted object is the $i^{th}$ class, and $y_i$ indicates whether the true class is the $i^{th}$ class, if yes, the value is 1, otherwise, the value is 0.

The calculation method of the embedding loss is shown in formula (7):

$$\mathcal{L}_{emb} = \left| d(E, R_i) - \min_{j \neq i} d(E, R_j) + \alpha \right|_+ \quad (7)$$

where, j indicates a serial number of the predicted class, i indicates a serial number of the true class, a indicates a manually set threshold, $|.|_+$ indicates a Rectified Linear Unit (ReLU) function, E indicates the embedding vector, and $R_i$ indicates a feature vector corresponding to the $i^{th}$ preset class.

A70: obtaining, based on the regression decoupled representation feature and the regression a priori reference box and through the convolution sub-network, offsets of center coordinates, a width and a height of a predicted regression box relative to the regression a priori reference box to be used as predicted offsets; and adjusting the regression a priori reference box according to the predicted offsets to obtain the predicted regression box.

In this embodiment, the regression box prediction module uses the same method as the general detector. To be specific, the regression decoupled representation feature is input into the convolution sub-network to obtain the offsets of the predicted regression box relative to the a priori reference box in terms of the center coordinates, the width and the height. The regression reference box is adjusted with reference to the predicted offset, to obtain the regression box of each to-be-detected object in the training sample image, as the predicted regression box.

A80: obtaining true offsets of center coordinates, a width and a height of the true regression box of each to-be-detected object relative to the regression a priori reference box; and calculating a loss between the predicted offsets and the true offsets to be used as a fifth loss.

In this embodiment, the loss between the predicted offset and the true offset is calculated as shown in formula (8):

$$\mathcal{L}_{reg} = \sum_{i \in [\Delta x, \Delta y, \Delta w, \Delta h]} \begin{cases} 0.5(t_i - p_i)^2, & |t_i - p_i| < 1 \\ |t_i - p_i| - 0.5, & \text{others} \end{cases} \quad (8)$$

where, $t_i$ indicates the true offsets, $p_i$ indicates the predicted offsets, $\Delta x$ and $\Delta y$ indicate the offsets of the center coordinates of the predicted box, and $\Delta w$ and $\Delta h$ indicate the offsets of the width and the height of the predicted box, respectively.

A90: performing a weighted summation on the first loss, the second loss, the third loss, the fourth loss and the fifth loss to obtain a total loss; and updating network parameters of the small-sample-object detection network DMNet based on the total loss.

In this embodiment, the weighted summation is performed on the obtained first loss, second loss, third loss, fourth loss, and fifth loss, to obtain the total loss, as shown in formula (9):

$$\mathcal{L} = \omega_1 \mathcal{L}_{obj} + \chi_2 \mathcal{L}_{shape} + \omega_3 \mathcal{L}_{cls} + \omega_4 \mathcal{L}_{emb} + \omega_5 \mathcal{L}_{reg} \quad (9)$$

where, $\omega_i$ indicates a weight corresponding to each loss function.

The network parameters of the small-sample-object detection network DMNet are updated based on the obtained total loss.

A100: repeating steps A10 to A90 until a trained small-sample-object detection network DMNet is obtained.

In this embodiment, the small-sample-object detection network DMNet is cyclically trained until the network converges.

2. Single-Stage Small-Sample-Object Detection Method Based on Decoupled Metric

Obtain a to-be-detected image as an input image; and obtain a class and a regression box corresponding to each to-be-detected object in the input image through a pre-constructed small-sample-object detection network DMNet; the regression box includes information about position, width and height.

In this embodiment, the to-be-detected image is obtained, and is input into the trained small-sample-object detection network DMNet to obtain a class and regression box corresponding to each to-be-detected object in the input image. A specific process is as follows:

Extract a multi-scale feature of the input image, and perform convolution on the extracted multi-scale feature, where the feature obtained after the convolution is performed is used as a first feature.

Input the first feature into the DRT module to obtain a classification a priori reference box and a classification decoupled representation feature, or a regression a priori reference box and a regression decoupled representation feature. Details are as follows:

Obtain a foreground probability corresponding to each feature position of the first feature, namely, a predicted foreground probability.

Set a foreground probability threshold, extract and retain a corresponding decoupled representation feature and an a priori reference box at a position where the predicted foreground probability is greater than the specified threshold, and filter out decoupled representation features and an a priori reference boxes at other positions.

Embed the retained classification decoupled representation feature into the metric feature space through the embedding unit to obtain the embedding vector; and calculate a distance between the embedding vector and the feature vector corresponding to the preset class to obtain a class of each to-be-detected object in the input image.

The predicted offsets relative to the a priori reference box in terms of the center coordinates, width and height are obtained through the convolution sub-network based on the retained regression decoupled representation feature, and the predicted offsets are used for the a priori reference box to calculate the regression box of each to-be-detected object in the input image.

Figure 5A:
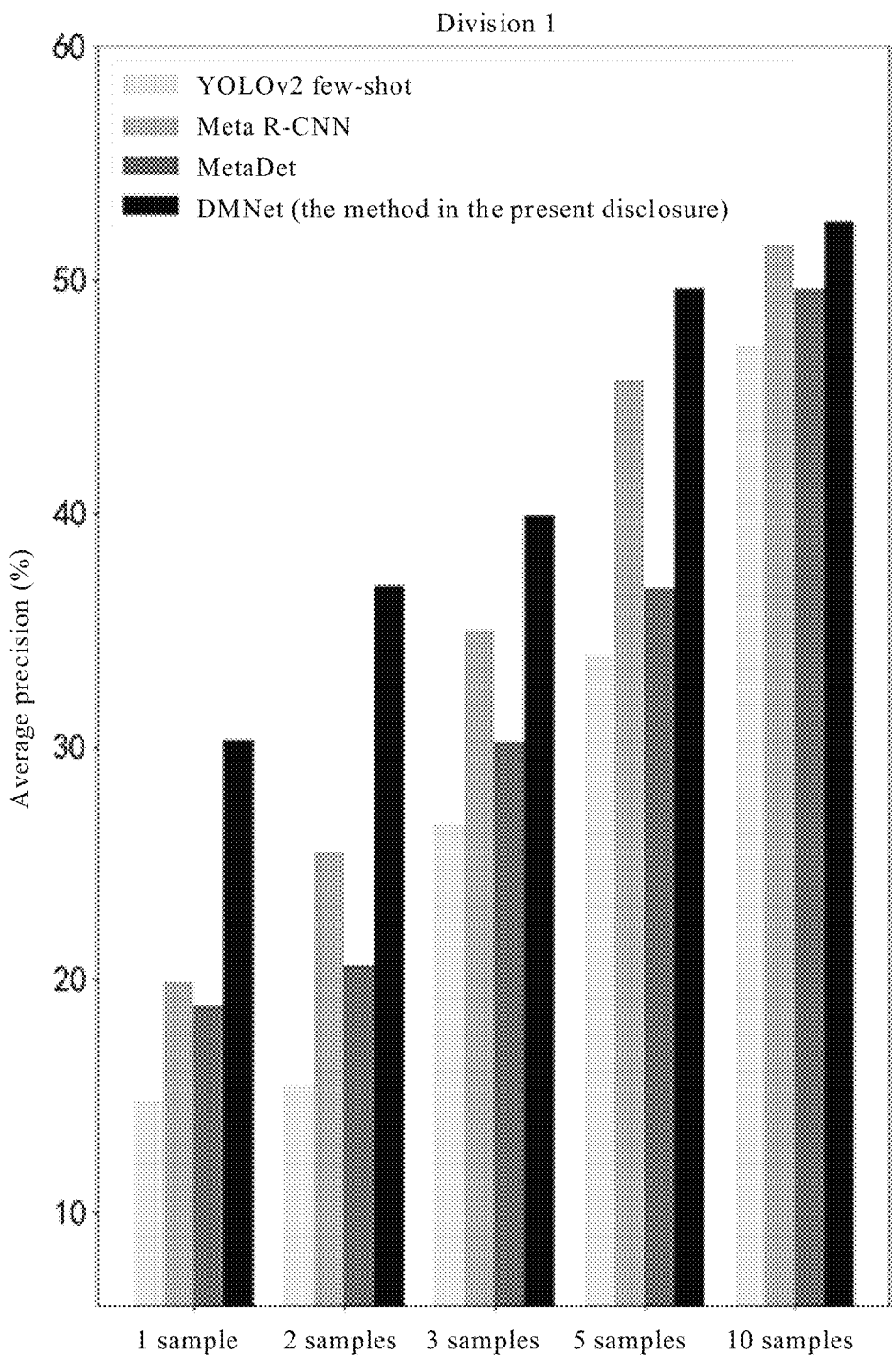
FIG. 5A to FIG. 5C are schematic diagrams of comparison between experimental results on the PASCAL VOC data set of the DMNet and other existing small-sample-object detection methods according to an embodiment of the present invention.
Figure 5B:
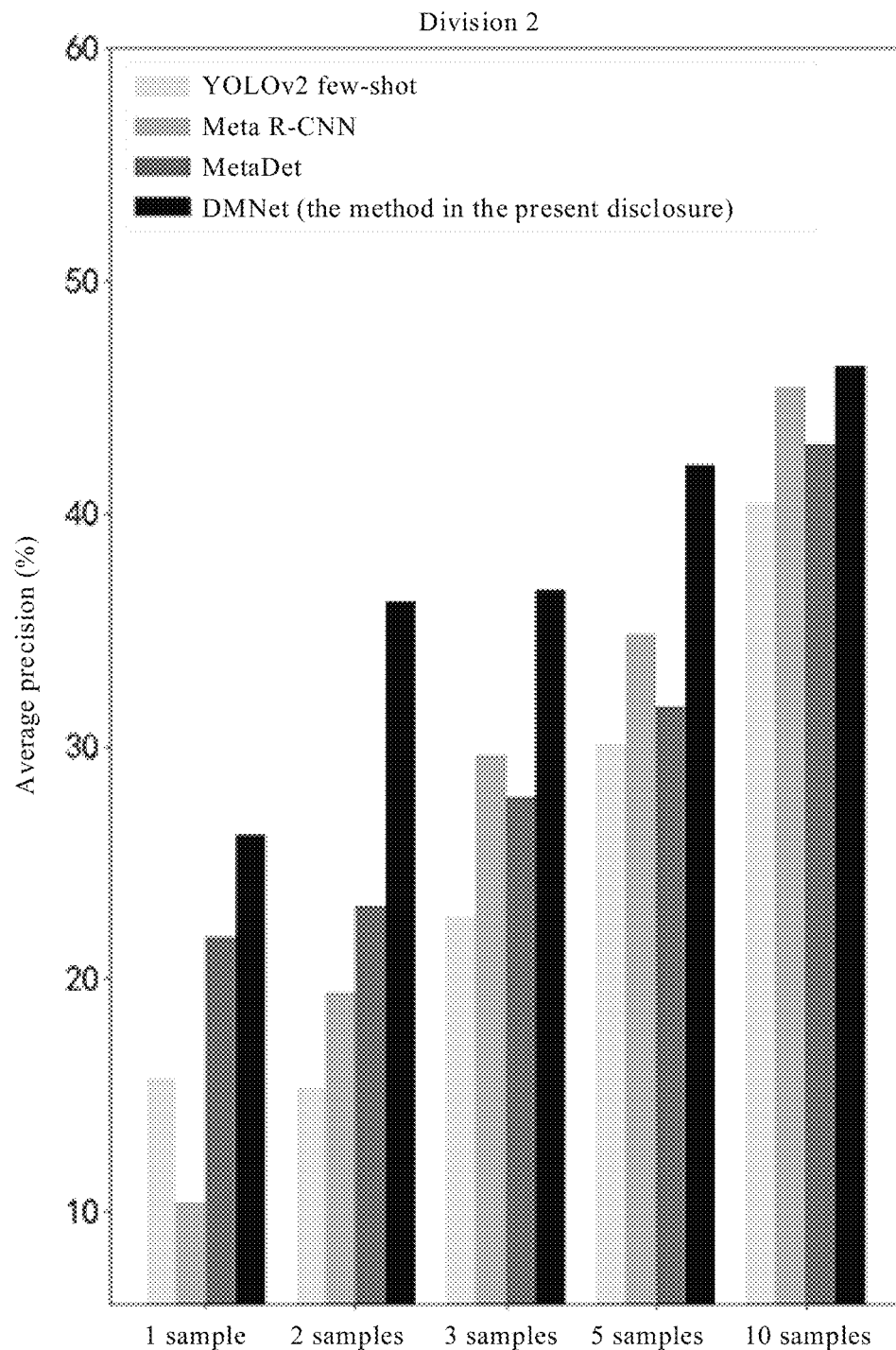
Figure 5C:
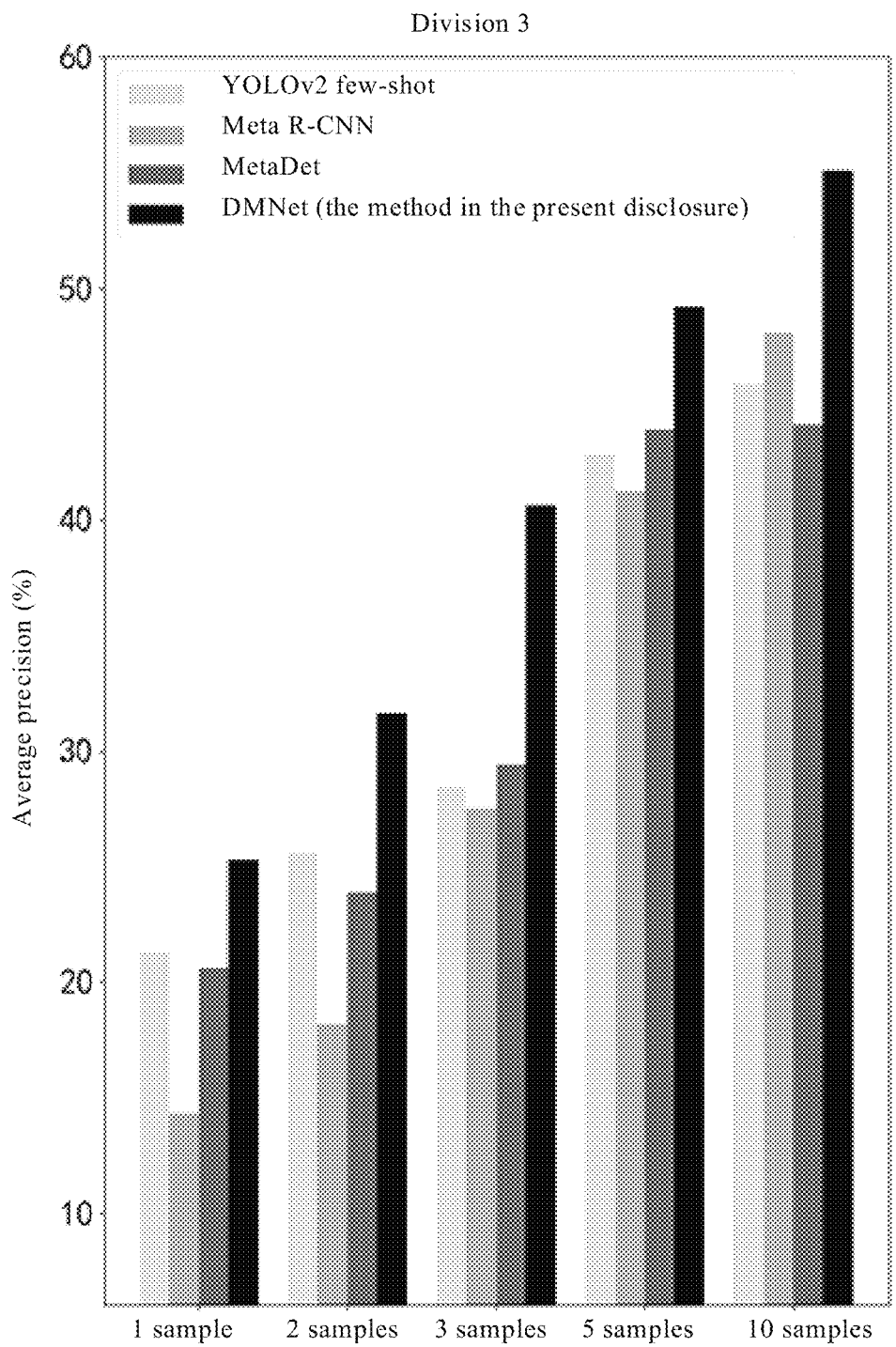

In addition, the present invention has been verified on the public data sets PASCAL VOC and MS COCO. The model training includes the following steps: (1) performing normal training on the base class; and (2) performing small sample training on a new class and the base class by using a model obtained in step (1). The detection accuracy of the final trained model on a new class test set is used as a measurement standard of model performance. When there are three groups of new classes/base classes on the VOC, the experimental results are shown in FIG. 5A to FIG. 5C, the evaluation standard is mean Average Precision (mAP), the IoU threshold is 0.5, 1 sample, 2 samples, 3 samples, 5 samples and 10 samples respectively indicate 1, 2, 3, 5 and 10 training samples for each new class. It can be seen that the detection accuracy of the present invention is better than other existing methods. In the case of very few training samples (1 to 3 training samples), the advantages of the present invention are more obvious. When COCO is used as the base class and VOC is used as the new class (to be specific, it is assumed that the COCO data set has 80 classes and VOC has 20 classes, the 80 classes of COCO include 20 classes of VOC, but only include the class names, training and test image data has no intersection at all. these are two completely independent data sets, and that "VOC is used as the new class" means that the COCO base class/new class is 60/20), there are 10 training samples, the evaluation standard is mAP, and the IoU threshold is 0.5:0.95, results of the YOLO second generation of small sample detection (YOLOv2 few-shot), the meta learning regression-convolutional neural network (Meta R-CNN), the meta learning detection (MetaDet) and the decoupled metric network (DMNet) were 5.6%, 8.7%, 7.1% and 9.3%, respectively. The experimental results still show that the present invention is superior to other existing methods.

A single-stage small-sample-object detection system based on decoupled metric according to a second embodiment of the present invention includes: a prediction module.

The prediction module is configured to obtain a to-be-detected as an input image; and obtain a class and a regression box corresponding to each to-be-detected object in the input image through a pre-constructed small-sample-object detection network DMNet, where the DMNet includes a multi-scale feature extraction network, a decoupled representation transformation (DRT) module, an image-level distance metric learning (IDML) module, and a regression box prediction module;

the multi-scale feature extraction network is configured to extract a multi-scale feature of the input image, and perform convolution on the extracted multi-scale feature, where a feature obtained after the convolution is performed is used as a first feature;

the DRT module is constructed based on a first convolution branch, a classification branch, and a regression branch;

the first convolution branch is configured to perform background filtering on the first feature to obtain a foreground feature;

the classification branch and the regression branch are both constituted based on two convolutional layers and one deformable convolutional layer; the classification branch and the regression branch are both configured to perform convolution and deformable convolution on the first feature in combination with the foreground probability, to obtain an a priori reference box and an adaptive decoupled representation feature, that is, to obtain a classification a priori reference box and a classification decoupled representation feature, or a regression a priori reference box and a regression decoupled representation feature;

the IDML module is configured to embed the classification decoupled representation feature into a metric feature space through a pre-constructed embedding unit to obtain an embedding vector; and to calculate a distance between the embedding vector and a feature vector corresponding to a preset class to obtain a class of each to-be-detected object in the input image; the embedding unit is constituted based on two 1×1 convolutions; and the regression box prediction module is configured to obtain the regression box of each to-be-detected object in the input image through a pre-constructed convolution sub-network based on the regression decoupled representation feature and the regression a priori reference box.

A person skilled in the art can clearly understand that, for convenience and brevity of description, reference can be made to corresponding processes in the foregoing method embodiment for specific working processes of the above-described system. Details are not described herein again.

It should be noted that the single-stage small-sample-object detection system based on decoupled metric provided in the foregoing embodiment is only illustrated by an example of division into the above-mentioned functional modules. In practical applications, the above-mentioned functions may be allocated to different functional modules according to needs. To be specific, the modules or steps in the embodiments of the present invention are further decomposed or combined. For example, the modules in the above embodiments may be combined into one module, or further divided into multiple sub-modules to complete all or some of the functions. The names of the modules or steps in the embodiments of the present invention are only for distinguishing the modules or steps, and are not construed as improper limitations on the present invention.

A third embodiment of the present invention provides a device, including: at least one processor and a memory communicatively connected with the at least one processor. The memory stores instructions that can be executed by the processor, and the instructions are used to be executed by the processor to implement the single-stage small-sample-object detection method based on decoupled metric described above.

A fourth embodiment of the present invention provides a computer readable storage medium. The computer readable storage medium stores computer instructions, and the computer instructions are used to be executed by the processor to implement the single-stage small-sample-object detection method based on decoupled metric described above.

A person skilled in the art can clearly understand that, for convenience and brevity of description, reference can be made to corresponding processes in the foregoing method embodiment for specific working processes of the above-described storage apparatus and processing apparatus. Details are not described herein again.

Figure 6:
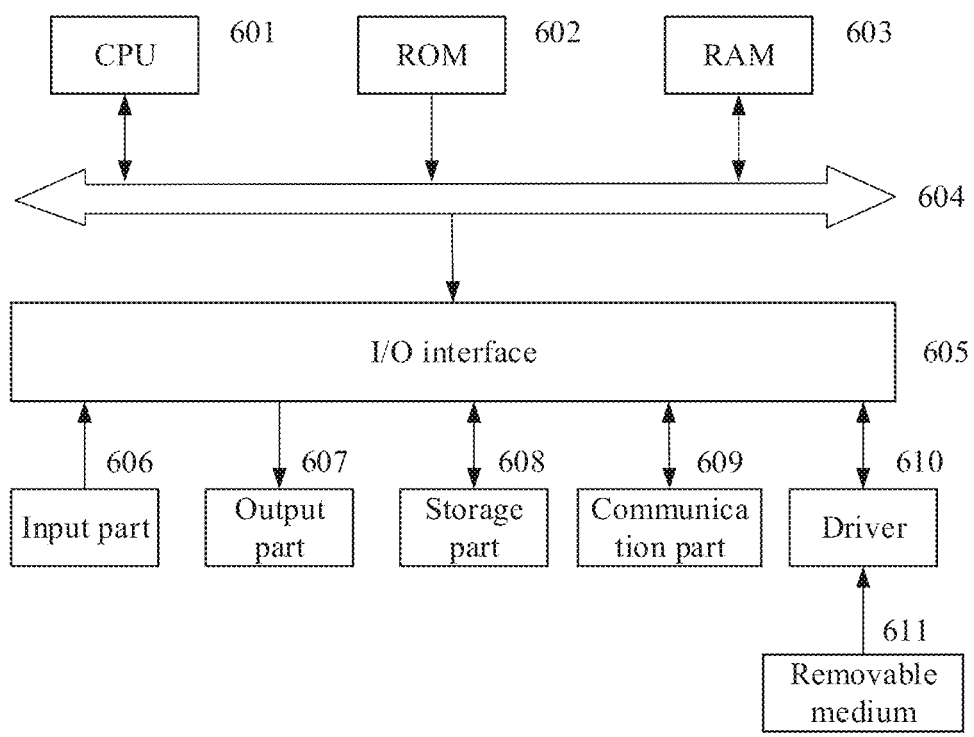
FIG. 6 is a schematic structural diagram of a computer system of an electronic device suitable for implementing the embodiments of this application according to an embodiment of the present invention.

Refer to FIG. 6 below, which is a schematic structural diagram of a computer system of a server suitable for implementing the method, system and device embodiments of this application. The server shown in FIG. 6 is merely an example, and should not cause any limitation to the functions and application range of the embodiments of this application.

As shown in FIG. 6, the computer system includes a central processing unit (CPU) 601, which can perform various suitable actions and processing according to a program in a read-only memory (ROM) 602 or a program loaded from a storage part 608 to a random access memory (RAM) 603. The RAM 603 further stores various programs and data required for operations of the system. The CPU 601, the ROM 602, and the RAM 603 are mutually connected via the bus 604. An input/output (I/O) interface 605 is also connected to the bus 604.

The following components are connected to the I/O interface 605: an input part 606 including a keyboard, a mouse, and the like; an output part 607 including a cathode-ray tube (CRT), a liquid crystal display (LCD), a loudspeaker, and the like; a storage part 608 including a hard disk; and a communication part 609 including a network interface card such as a local area network (LAN) card or a modem. The communication part 609 executes communication processing via a network such as the Internet. A driver 610 may also be connected to the I/O interface 605 as required. A removable medium 611, such as a magnetic disk, an optical disc, a magneto-optical disc, a semiconductor memory, or the like, is installed on the driver 610 as required, so that a computer program read therefrom can be installed in the storage part 608 as required.

Particularly, according to the embodiments of the present invention, the process described above with reference to the flowchart may be implemented as a computer software program. For example, the embodiment of the present invention includes a computer program product, which includes a computer program carried by a computer readable medium. The computer program includes program code for executing the method shown in the flowchart. In this embodiment, the computer program may be downloaded from a network by means of the communication part 609 and installed, and/or be installed from the removable medium 611. When the computer program is executed by the CPU 601, the functions defined in the method of the present invention are executed. It should be noted that the computer readable storage medium in the present invention may be a computer readable signal medium or a computer readable storage medium or a combination thereof. For example, the computer readable storage medium may be, but is not limited to, electric, magnetic, optical, electromagnetic, infrared, or semiconductor system, apparatus or device, or any combination of the above. More specific embodiments of the computer readable storage medium may include, but are not limited to: an electric connector with one or more wires, a portable computer magnetic disk, a hard drive, a random access memory (RAM), a read-only memory (ROM), an erasable programmable read-only memory (EPROM or flash drive), an optical fiber, a compact disk read-only memory (CD-ROM), an optical storage device, a magnetic storage device, or any proper combination of the above. In this application, the computer readable storage medium may be any tangible medium containing or storing a program, and the program may be used by or used in combination with an instruction execution system, apparatus or device. In this application, the computer readable signal medium may include a data signal propagated in a baseband or propagated as a part of a carrier, and carries computer readable program code. Such a propagated data signal may be in multiple forms, including, but not limited to an electromagnetic signal, an optical signal, or any proper combination of the above. The computer readable signal medium may also be any computer readable storage medium except the computer readable medium. The computer readable storage medium may send, propagate or transmit a program used by or used in combination with an instruction execution system, apparatus or device. The program code contained in the computer readable medium may be transmitted by using any suitable medium, including, but is not limited to radio, an electric wire, an optical fiber, RF, and the like, or any proper combination of the above.

Computer program code for executing the operations in this application may be compiled by using one or more program design languages or a combination thereof. The programming languages include object oriented programming languages, such as Java, Smalltalk, and C++, and conventional procedural programming languages, such as C or similar programming languages. The program code can be executed fully on a user computer, executed partially on a user computer, executed as an independent software package, executed partially on a user computer and partially on a remote computer, or executed fully on a remote computer or a server. In a circumstance in which a remote computer is involved, the remote computer may be connected to a user computer via any type of network, including a local area network (LAN) or a wide area network (WAN), or may be connected to an external computer (for example, connected via the Internet by using an Internet service provider).

The flowcharts and block diagrams in the accompanying drawings illustrate system architectures, functions and operations that may be implemented by the system, method and computer program product according to the embodiments of this application. In this regard, each block in the flowcharts or block diagrams may represent a module, a program segment or a part of code, and the module, the program segment or the part of code includes one or more executable instructions for implementing specified logic functions. It should also be noted that, in some alternative implementations, functions marked in the blocks may also take place in an order different from the order marked in the accompanying drawings. For example, two consecutive blocks can actually be executed substantially in parallel, and they may sometimes be executed in a reverse order, which depends on involved functions. It should also be noted that each block in the flowcharts and/or block diagrams and combinations of the blocks in the flowcharts and/or block diagrams may be implemented by a dedicated hardware-based system for executing specified functions or operations, or may be implemented by a combination of dedicated hardware and computer instructions.

Terms such as "first" and "second" are intended to distinguish between similar objects, rather than to necessarily describe or indicate a specific order or sequence.

In addition, terms "include", "include" or any other variations thereof are intended to cover non-exclusive inclusions, so that a process, a method, an article, or a device/apparatus including a series of elements not only includes those elements, but also includes other elements that are not explicitly listed, or also includes inherent elements of the process, the method, the article or the device/apparatus.

The technical solutions of the present invention are described with reference to the preferred implementations and accompanying drawings. Those skilled in the art should easily understand that the protection scope of the present invention is apparently not limited to these specific implementations. A person skilled in the art can make equivalent changes or substitutions to the relevant technical features without departing from the principles of the present invention, and the technical solutions after these changes or substitutions should fall within the protection scope of the present invention.

What is claimed is:

1. A single-stage small-sample-object detection method based on decoupled metric, comprising the following steps:
   obtaining a to-be-detected image as an input image; and
   obtaining a class and a regression box corresponding to each to-be-detected object in the input image through a pre-constructed small-sample-object detection network DMNet, wherein the regression box comprises information about position, width and height;
   wherein, the pre-constructed small-sample-object detection network DMNet comprises a multi-scale feature extraction network, a decoupled representation transformation (DRT) module, an image-level distance metric learning (IDML) module, and a regression box prediction module;
   the multi-scale feature extraction network is configured to extract a multi-scale feature of the input image, and perform convolution on the extracted multi-scale feature, wherein a feature obtained after the convolution is performed is used as a first feature;
   the DRT module is constructed based on a first convolution branch, a classification branch, and a regression branch;
   the first convolution branch is configured to obtain a foreground probability corresponding to each feature position of the first feature;
   the classification branch and the regression branch are both constituted based on two convolutional layers and one deformable convolutional layer; the classification branch and the regression branch are both configured to perform convolution and deformable convolution on the first feature in combination with the foreground probability, to obtain an a priori reference box and an adaptive decoupled representation feature, that is, to obtain a classification a priori reference box and a classification decoupled representation feature, or a regression a priori reference box and a regression decoupled representation feature, which specifically comprises:

performing convolution on the first feature to obtain information about width and height corresponding to an a priori reference box of an object in the input image;

retaining an a priori reference box of an object with a foreground probability being greater than a preset foreground probability threshold, and filtering out other a priori reference boxes used as backgrounds;

performing convolution on information about width and height of the retained a priori reference box to generate an offset; and performing deformable convolution on the first feature through the deformable convolutional layer in combination with the offset, to obtain an adaptive decoupled representation feature, that is, to obtain a classification decoupled representation feature or a regression decoupled representation feature;

the IDML module is configured to embed the classification decoupled representation feature into a metric feature space through a pre-constructed embedding unit to obtain an embedding vector; and to calculate a distance between the embedding vector and a feature vector corresponding to a preset class to obtain a class of each to-be-detected object in the input image, wherein the embedding unit is constituted based on two 1×1 convolutions; and the regression box prediction module is configured to obtain the regression box of each to-be-detected object in the input image through a pre-constructed convolution sub-network based on the regression decoupled representation feature and the regression a priori reference box.

2. The single-stage small-sample-object detection method based on the decoupled metric according to claim 1, wherein a method for calculating the distance between the embedding vector and the feature vector corresponding to the preset class to obtain the class of each to-be-detected object in the input image is as follows:

$$p_i(E) = \exp\left(-\frac{d_i^2(E, R_i)}{2\sigma^2}\right)$$

$$P(i|E) = \frac{p_i(E)}{\sum_{i=1}^{N_{cls}} p_i(E)}$$

wherein, E indicates the embedding vector, $R_i$ indicates a feature vector corresponding to an $i^{th}$ preset class, $d(E,R_i)$ indicates a distance between the embedding vector and the feature vector corresponding to the $i^{th}$ preset class, $p_i(E)$ indicates a probability that the embedding vector belongs to the $i^{th}$ preset class, $N_{cls}$ indicates a number of classes, and $P(i|E)$ indicates a confidence of each class, wherein a preset class with a maximum confidence is used as a class of a to-be-detected object.

3. The single-stage small-sample-object detection method based on the decoupled metric according to claim 1, wherein a method for training the pre-constructed small-sample-object detection network DMNet comprises:

A10: obtaining a training sample image, calibration information calibrated as a foreground or a background, a true class and a true regression box, wherein the calibration information calibrated as the foreground or the background, the true class and the true regression box correspond to each to-be-detected object;

A20: extracting a multi-scale feature of the training sample image, and performing convolution on the extracted multi-scale feature, wherein the feature obtained after the convolution is performed is used as the first feature;

A30: inputting the first feature into the DRT module to obtain the classification a priori reference box, the classification decoupled representation feature, the regression a priori reference box and the regression decoupled representation feature;

A40: selecting points in $R_p(x_g,y_g,\eta_p \times w_g,\eta_p \times h_g)$ as a positive training sample, and points outside $R_i(x_g,y_g,\eta_i \times w_g,\eta_i \times h_g)$ as a negative training sample, wherein $\eta_p$ and are preset parameters, $0<\eta_p<\eta_i\ll1$, $x_g,y_g,w_g,h_g$ indicate center coordinates, a width and a height of the true regression box, and $R_p$ and $R_i$ indicate rectangular areas; calculating a foreground loss in combination with a predicted foreground probability and calibration information corresponding to each point of the positive sample and the negative sample, wherein the foreground loss is used as a first loss; obtaining an intersection over union (IoU) between the regression a priori reference box and the true regression box, and calculating a loss between a true regression box corresponding to a maximum IoU and each regression a priori reference box to be used as a second loss;

A50: embedding the classification decoupled representation feature into the metric feature space through the pre-constructed embedding unit to obtain the embedding vector; calculating the distance between the embedding vector and the feature vector corresponding to the preset class to obtain a class of each to-be-detected object in the training sample image as a predicted class;

A60: calculating a cross-entropy loss in combination with a probability of the predicted class and the true class corresponding to each to-be-detected object to be used as a third loss; and calculating a loss between the predicted class and the corresponding true class to be used as a fourth loss;

A70: obtaining, based on the regression decoupled representation feature and the regression a priori reference box and through the convolution sub-network, offsets of center coordinates, a width and a height of a predicted regression box relative to the regression a priori reference box to be used as predicted offsets; and adjusting the regression a priori reference box according to the predicted offsets to obtain the predicted regression box;

A80: obtaining true offsets of center coordinates, a width and a height of the true regression box of each to-be-detected object relative to the regression a priori reference box; and calculating a loss between the predicted offsets and the true offsets to be used as a fifth loss;

A90: performing a weighted summation on the first loss, the second loss, the third loss, the fourth loss and the fifth loss to obtain a total loss; and updating network parameters of the small-sample-object detection network DMNet based on the total loss; and A100: repeating steps A10 to A90 until a trained small-sample-object detection network DMNet is obtained.

4. The single-stage small-sample-object detection method based on the decoupled metric according to claim 3, wherein the first loss $\mathcal{L}_{obj}$ is calculated by:

$$\mathcal{L}_{obj} = -\alpha(1-y_p)^\gamma y_t \log y_p - (1-\alpha)y_p^\gamma(1-y_t)\log(1-y_p)$$

wherein, $y_p$ indicates the predicted foreground probability, $y_t$ indicates whether the calibration information is the foreground, and if yes, a value is 1, otherwise, the value is 0, $\gamma$ indicates a scaling factor, and $\alpha$ indicates a balance factor.

5. The single-stage small-sample-object detection method based on the decoupled metric according to claim 3, wherein the second loss $\mathcal{L}_{shape}$ is calculated by:

$$\mathcal{L}_{shape} = \mathcal{L}_1\left(1 - \min\left(\frac{w}{w_t}, \frac{w_t}{w}\right)\right) + \mathcal{L}_1\left(1 - \min\left(\frac{h}{h_t}, \frac{h_t}{h}\right)\right)$$

wherein, w and h indicate a width and a height of the regression a priori reference box, respectively, $\mathcal{L}_1$ indicates a smooth L1 loss, and $(w_t, h_t)$ indicate a width and a height of the true regression box corresponding to the maximum IoU.

6. The single-stage small-sample-object detection method based on the decoupled metric according to claim 3, wherein the third loss $\mathcal{L}_{cls}$ is calculated by:

$$\mathcal{L}_{cls} = -\sum_i y_i \log p_i$$

wherein, $p_i$ indicates a probability that a predicted object is an $i^{th}$ class, and $y_i$ indicates whether the true class is the $i^{th}$ class, if yes, a value is 1, otherwise, the value is 0.

7. The single-stage small-sample-object detection method based on the decoupled metric according to claim 3, wherein the fourth loss $\mathcal{L}_{emb}$ is calculated by:

$$\mathcal{L}_{emb} = \left| d(E, R_i) - \min_{j \neq 1} d(E, R_i) + \alpha \right|_+$$

wherein, j indicates a serial number of the predicted class, i indicates a serial number of the true class, $\alpha$ indicates a manually set threshold, $|.|_+$ indicates a Rectified Linear Unit (ReLU) function, E indicates the embedding vector, and $R_i$ indicates a feature vector corresponding to an $i^{th}$ preset class.

8. The single-stage small-sample-object detection method based on the decoupled metric according to claim 3, wherein the fifth loss $\mathcal{L}_{reg}$ is calculated by:

$$\mathcal{L}_{reg} = \sum_{i \in \{x,y,w,h\}} \begin{cases} 0.5(t_i - p_i)^2, & |t_i - p_i| < 1 \\ |t_i - p_i| - 0.5, & \text{others} \end{cases}$$

wherein, $t_i$ indicates the true offsets, $p_i$ indicates the predicted offsets, x and y indicate offsets of the center coordinates of the predicted regression box, and w and h indicate offsets of the width and the height of the predicted regression box, respectively.

9. The single-stage small-sample-object detection method based on the decoupled metric according to claim 3, wherein the total loss is calculated by:

$$\mathcal{L} = \omega_1 \mathcal{L}_{obj} + \omega_2 \mathcal{L}_{shape} + \omega_3 \mathcal{L}_{cls} + \omega_4 \mathcal{L}_{emb} + \omega \mathcal{L}_{reg}$$

wherein, $\omega_i$ indicates a weight corresponding to each loss function, $\mathcal{L}_{obj}$ indicates the first loss, $\mathcal{L}_{shape}$ indicates the second loss, $\mathcal{L}_{cls}$ indicates the third loss, $\mathcal{L}_{emb}$ indicates the fourth loss, and $\mathcal{L}_{reg}$ indicates the fifth loss.

* * * * *